United States Patent [19]
Irving et al.

[11] Patent Number: 5,991,743
[45] Date of Patent: Nov. 23, 1999

[54] SYSTEM AND METHOD FOR PROACTIVELY MONITORING RISK EXPOSURE

[75] Inventors: Russell Robert Irving, Ballston Lake; Angelika Dorothea Linden, Niskayuna; James Patrick Quaile, Scotia, all of N.Y.

[73] Assignee: General Electric Company, Schenectady, N.Y.

[21] Appl. No.: 08/885,499

[22] Filed: Jun. 30, 1997

[51] Int. Cl.$^6$ .................................................. G06F 19/00
[52] U.S. Cl. .................. 705/36; 706/45; 706/49
[58] Field of Search ................ 705/36; 706/45, 706/49

[56] References Cited

U.S. PATENT DOCUMENTS

| | | | |
|---|---|---|---|
| 5,101,362 | 3/1992 | Simoudis . | |
| 5,448,722 | 9/1995 | Lynne et al. . | |
| 5,506,999 | 4/1996 | Skillman et al. . | |
| 5,644,727 | 7/1997 | Atkins | 705/40 |
| 5,696,907 | 12/1997 | Tom | 705/36 |
| 5,701,400 | 12/1997 | Amado | 395/76 |

Primary Examiner—Allen R. MacDonald
Assistant Examiner—Penny Caudle
Attorney, Agent, or Firm—David C. Goldman; Jill M. Breedlove

[57] ABSTRACT

The present invention discloses a system and method for proactively monitoring risk exposure. In this invention, risk related information is received at an input knowledge source. A shared database stores the risk related information received at the input knowledge source. A plurality of domain knowledge sources formulates a decision on how the risk related information in the shared database affects a predetermined risk category. An output knowledge source generates a risk related report in response to the decisions formulated by each of the plurality of domain knowledge sources. A risk analytics router routes the risk related information in the input knowledge source to the shared database, the risk related information in the shared database to at least one of the domain knowledge sources, the decisions formulated from the domain knowledge sources to the shared database, and the decisions from the shared database to the output knowledge source.

17 Claims, 6 Drawing Sheets

FIG. 6

For:
ABC Inc.                    Date:6/14/95          SIC:2024:

Description
Manufactures and distributes premium ice cream products and other frozen dairy foods business and resides in Anytown, NY, USA. It is a Publicly owned company.

Alert:
Overall Business Rating has changed from Strong to Marginal based on your known profile and industry standards and trends. This down grade was caused by your Weak Net Cash Flow/DS.

| $MM(millions) $ | 12/31/90 | 12/31/91 | 12/31/92 |
|---|---|---|---|
| Working Capital | 13.9 | 19.4 | 25.8 |
| Total Debt | 86.0 | 110.9 | 181.4 |
| Tangible Net Worth | 60.9 | 74.7 | 37.6 |
| Debt/TNW | 1.4 | 1.5 | 4.8 |
| Sales | 308.3 | 354.9 | 407.0 |
| Operating Income | 23.6 | 28.7 | 26.8 |
| Net Profits(Loss) | 11.8 | 15.9 | 15.7 |
| Cash Flow | 4.5 | 7.6 | 4.5 |
| Debt Service |  | 5.5 | 6.8 |

FINANCIAL SUMMARY
The financial analysis is based in part on industry standard data supplied by Joseph Minjo Associates (JMA). In particular this analysis is based on 1993 data for SIC 2024, ICE CREAM AND FROZEN DESSERTS.

|  | VALUE | OPINION |
|---|---|---|
| Net Cash Flow | 0.22 | Weak |
| Current Ratio | 1.42 | Marginal |
| D/TNW | 3.82 | Marginal |
| Profitability | 6.23 | Strong |

The Financial Rating for ABC Inc is marginal.

Comments:

ENTERPRISE RATING AND SUMMARY

Overall Company rating is Marginal based on the following consideration:

Enterprise Rating       Strong
Industry Rating         Marginal
Business Rating         Strong
Financial Rating        Marginal
Collateral              Marginal

Recommendations: Actions aimed at reducing debt service and improving liquidity, e.g.asset sale-leaseback, desirable to improve balance sheet performance. Recommended range: $20 - 30MM.

SYSTEM AND METHOD FOR PROACTIVELY MONITORING RISK EXPOSURE

FIELD OF THE INVENTION

The present invention relates generally to risk analysis and more particularly to a system and method for proactively monitoring risk exposure.

BACKGROUND OF THE INVENTION

In the financial services industry, an increase in profit is typically brought about by increasing the volume of financial service contracts, reducing losses from active financial service contracts, or by both increasing the volume of financial service contracts and reducing losses from active financial service contracts. The major source of loss in any type of credit instrument is typically due to default in payment by the financial service clients. In order to reduce incidences of default in payment, a great deal of effort is expended in estimating the credit worthiness of the financial service clients. Despite the large amount of effort expended in making a credit decision, it is almost inevitable that the financial circumstances of the financial service clients will change after the date that the decision was made. However, the financial services industry has not expended the same amount of effort on monitoring the risk exposure to the financial service clients as compared to the underwriting process of determining credit worthiness. The result of placing a lot of effort on the underwriting process has addressed the needs to eliminate bad risks and minimize rejections of potentially good clients. However, the financial services industry has expended very little effort on monitoring the financial circumstances of their clients after the date that a credit decision was made. Monitoring the financial circumstances of the clients after a credit decision is made, is likely to increase profits for the financial service providers. Accordingly, there is a need to proactively monitor the financial circumstances of financial service clients after the date that a credit decision has been made.

SUMMARY OF THE INVENTION

This invention monitors the financial circumstances of financial service clients after the date that a credit decision has been made by proactively monitoring a plurality of risk factors. Some of the plurality of risk factors that are monitored are credit history, the financial health of the client, the current economic conditions of the client's industry, and the current economic conditions of the geographic regions that the client does business in. For each of the plurality of risk factors, various risk related information is obtained for the portfolios of financial service clients and processed to determine if there is an overexposure to risk for the service provider. After processing, a risk related report is generated and used to notify the financial service provider of any potential risks that their clients or the company as a whole will be exposed to. As a result, the number of incidences of default will be lower as will the number of rejections of potentially good clients.

In accordance with this invention, there is provided a system and method for monitoring risk exposure. In this invention, risk related information is received from a plurality of data sources at an input knowledge source. The risk related information received at the input knowledge source is stored in a shared database. A risk analytics router is notified that risk related information has been received and is being stored in the shared database. The risk analytics router routes the risk related information in the shared database to at least one of a plurality of domain knowledge sources. At least one of the plurality of domain knowledge sources formulates a decision on how the risk related information in the shared database affects a predetermined risk category. The risk analytics router routes the decisions formulated from the domain knowledge sources to the shared database. Then the risk analytics router routes the decisions from the shared database to an output knowledge source which generates a risk related report.

DESCRIPTION OF THE DRAWINGS

FIG. 6 is an example of a risk report generated in accordance with this invention.

DETAILED DESCRIPTION OF THE INVENTION

Figure 1:
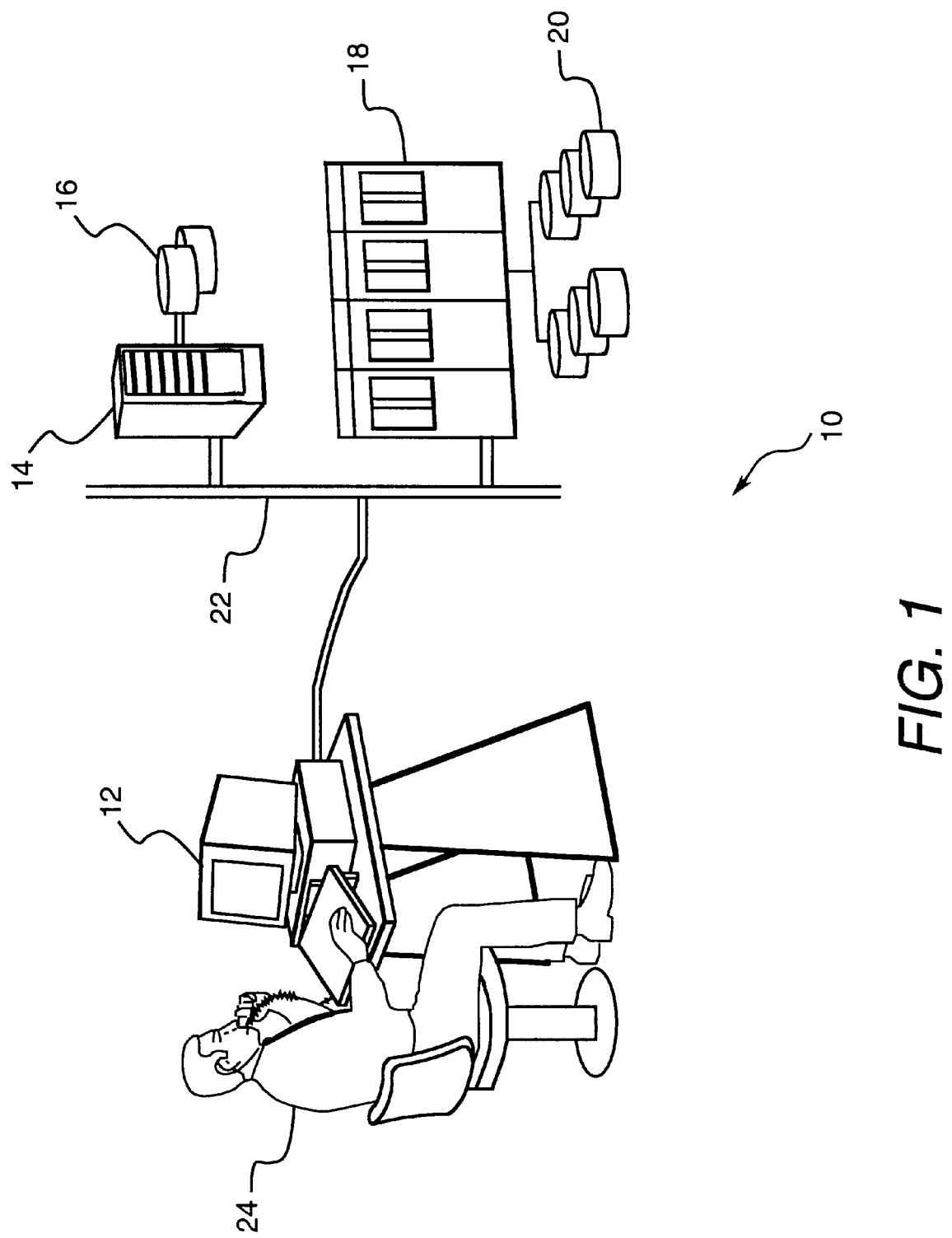
FIG. 1 shows a block diagram of a proactive risk monitoring system according to this invention.

FIG. 1 shows a block diagram of a proactive risk monitoring system 10 according to this invention. The proactive risk monitoring system 10 includes a personal computer or workstation 12, a database server 14 dedicated to storing a shared database 16, a computer server 18, and large volumes of data 20. The computer 12, the database server 14, and the computer server 18 are connected together by a network 22. Risk related information is collected, processed, and organized in a proactive manner as new information is received. Risk related information that indicates an overexposure or underexposure of risk triggers a risk related message to a risk manager 24. The risk related message is sent to the risk manager 24 by electronic mail, voice mail, and/or facsimile. The risk manager 24 accesses the proactive risk monitoring system 10 via the computer 12 and is able to find out more information about the risk related message. For example, if the risk related message indicates an overexposure to risk, then the risk manager can find out which parts of the portfolio are at risk, which clients are affected by the message, the industries that are affected by the message, the geographic locations that are affected by the message, and the underlying reasons for the message. In addition, other information can be ascertained such as the total amount of exposure to individual clients, the stock price of the client, and other financial statistics such as price to earnings ratio. If the message indicates that there is an underexposure to risk, then the risk manager is provided with the opportunities that are available to take advantage of this underexposure (i.e., to increase profit). For example, the risk manager can find which clients are affected by the underexposure, the industries that are affected by the underexposure, the geographic locations that are affected by the underexposure, and the underlying reasons for the underexposure. The risk related message can also be used to provide a status report on any one of their clients.

Figure 2:
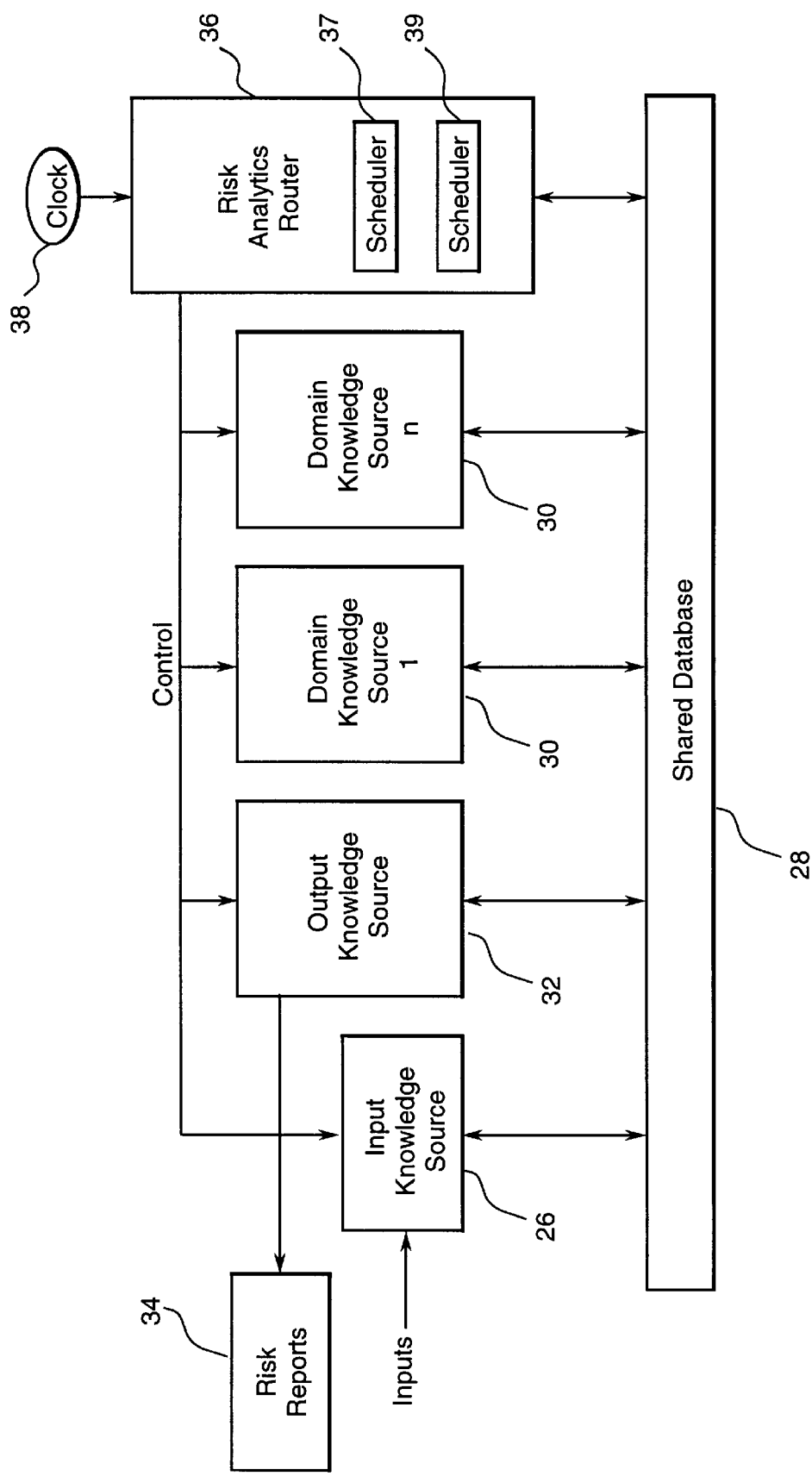
FIG. 2 shows a block diagram of the processing architecture of a database server and a shared database that is used in the proactive risk monitoring system.

FIG. 2 shows a block diagram of the database server 14 and the shared database 16 in more detail. In particular, FIG. 2 shows the processing architecture of the database server 14 and the shared database 16. The processing architecture includes an input knowledge source 26 for receiving the risk related information from a plurality of data sources. In this invention, the risk related information contains all of the portfolio data of the service provider such as descriptions of the client's business, financial summaries, information on the client's customers and suppliers, and the industry that the client is in. Other risk related information that may be received are unemployment data broken down by Standard Industry Code (SIC) and geography according to the Metropolitan Statistical Area (MSA). This invention is not limited to the above-noted risk related information and may use other forms of information if desired. This information is obtained from sources such as the U.S. Department of Commerce, Regional Financial Associates, Data Buffet, U.S. Department of Labor, and other databases containing portfolio and deal data. A shared database 28 stores the risk related information received at the input knowledge source 26. The shared database 28 could be physically distributed and the input knowledge source 26 does not necessarily control the physical movement of data, but monitors the availability of new risk related information. A plurality of domain knowledge sources 30 are used to formulate a decision on how the risk related information in the shared database 28 affects a predetermined risk category. Possible predetermined risk categories are the credit history of the client, the financial health of the client, the current economic condition of the client's industry, and the current economic condition of the geographic regions that the client does business in. These risk categories are only examples of some of the considerations that are taken into effect when monitoring risk exposure and other categories such as technology legislation made by the government, industry changes, and changes to customers of clients may be used if desired. An output knowledge source 32 generates a risk report 34 in response to the decisions formulated from each of the domain knowledge sources 30. A risk analytics router 36 controls the operation of the input knowledge source 26, the shared database 28, the domain knowledge sources 30, and the output knowledge source 32 through a clock 38. More specifically, the risk analytics router 36 routes the risk information in the input knowledge source 26 to the shared database 28, the risk information in the shared database to at least one of the plurality of domain knowledge sources 30, the decisions formulated in the domain knowledge sources to the shared database, and the decisions from the shared database to the output knowledge source 32.

The input knowledge source 26 functions as an independent processing unit and is responsible for receiving updated risk related information from the plurality of data sources. Depending on the frequency and regularity of the updated risk related information, the input knowledge source 26 can receive the information on a continuous basis, on a defined schedule, or upon request of the risk manager 24. Upon receiving the risk related information, the input knowledge source 26 translates the information into data objects. Translation is necessary because each data source supplies data in a different format. Each of these formats must be translated to the standardized table formats of the shared database 28. The input knowledge source 26 contains function(s) (i.e., translation rules) for each data source, that are responsible for transposing the raw data into the standard format of the shared database 28. After data translation, the input knowledge source 26 stores the risk related information in the shared database 28 and notifies the risk analytics router 36 that the information is being stored in the database.

The shared database 28 functions as a bulletin board that records all of the risk related information received at the input knowledge source 26. After the risk analytics router 36 has been notified that updated risk related information is being stored in the shared database 28, the router notifies each of the domain knowledge sources 30 that the updated information is being stored in the database. Each of the domain knowledge sources 30 are independent processing units that formulate decisions on how the updated information in the shared database 28 affects a predetermined risk category. The decisions are formulated using artificial intelligence techniques such as example-based evidential reasoning, neural networks, etc. with various economic models. The risk analytics router 36 then polls each of the domain knowledge sources 30 to see if any of the knowledge sources are interested in acting on the updated risk related information. More specifically, each of the domain knowledge sources 30 decide whether the updated risk related information affects the predetermined risk category that it is assigned to. If any of the domain knowledge sources 30 are interested in acting on the updated risk related information, then the knowledge source generates a bid to act on the information. The shared database 28 receives the bids generated from the domain knowledge sources 30 and stores the bids in a bid list.

The risk analytics router 36 also receives the bids generated from the domain knowledge sources 30 and has a scheduler 37 to prioritize the bids and assign tasks to be performed by the domain knowledge sources. After a schedule has been generated the risk analytics router 36 through a dispatcher 39 dispatches the assigned tasks to the domain knowledge sources 30 that have bid to formulate a decision on how the updated risk related information affects the predetermined risk category. The decisions formulated by the domain knowledge sources are routed to the shared database 28 and stored in the form of a message. After each of the domain knowledge sources 30 in the schedule has formulated a decision and all of the messages have been stored in the shared database 28, then the risk analytics router 36 routes the messages from the database to the output knowledge source 32. The output knowledge source 32, an independent processing unit, then uses the messages to generate a risk related message which is sent to the risk manager 24.

Figure 3:
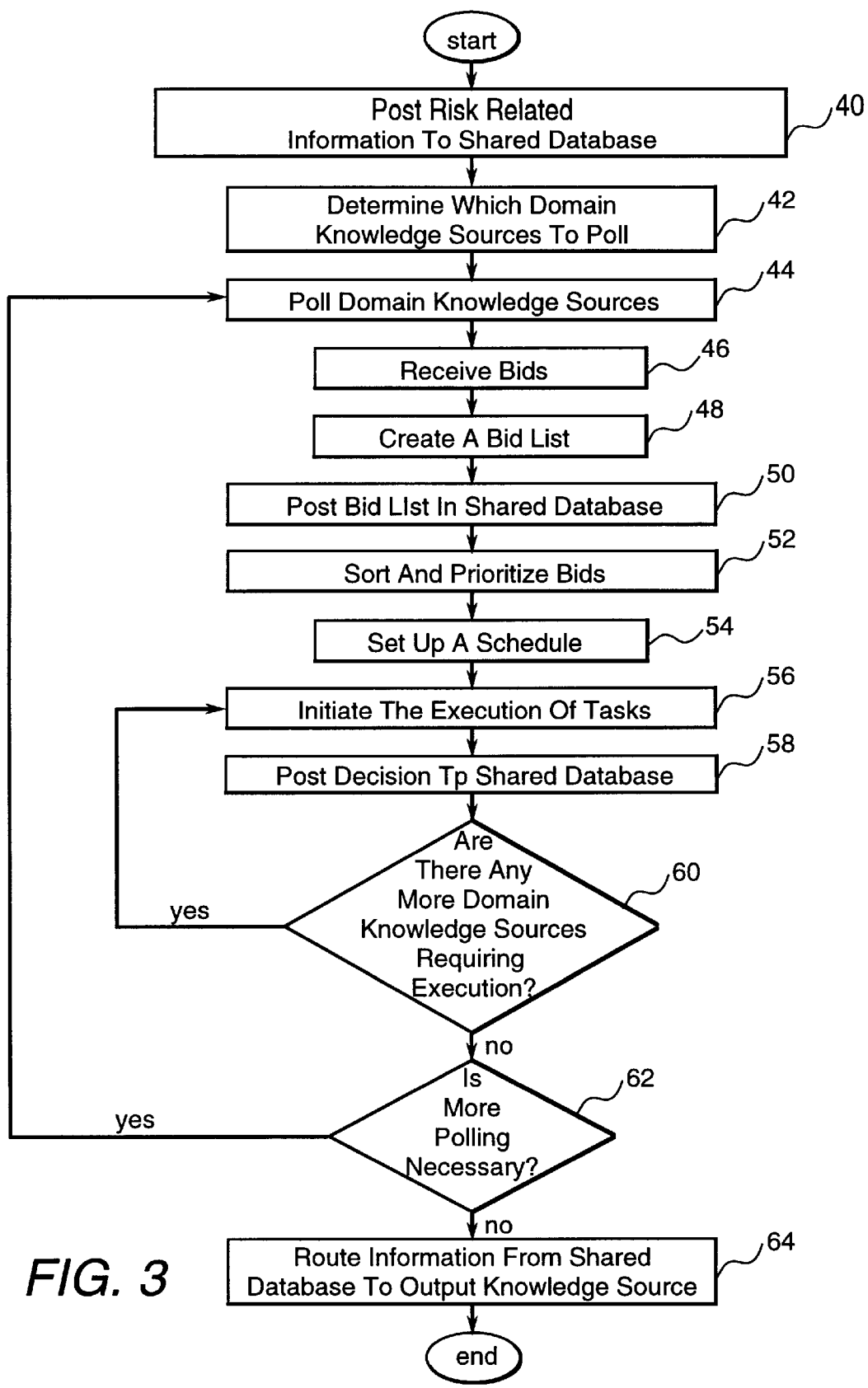
FIG. 3 is flow chart describing the operations performed by the risk analytics router.

FIG. 3 is a flow chart describing the operation of the risk analytics router 36 after notification that updated risk related information has been received at the input knowledge source 26. Upon notification, the risk analytics router 36 posts the updated risk related information to the shared database 28 at 40. Next, the risk analytics router 36 determines at 42 which of the domain knowledge sources 30 may be interested in processing the risk related information to see if it affects a predetermined risk category. In particular, the risk analytics router 36 accesses control tables stored in the database 16 and determines which domain knowledge sources 30 to poll. An example of a control table used to determine polling is set forth in Table 1.

TABLE 1

Control Table

| status_change_type | KS_to_poll |
|---|---|
| new econ data to load | $KS_1$, $KS_5$ |
| new econ data available | $KS_2$ |
| new state conditions | $KS_3$ |
| new deals for state conditions | $KS_3$ |
| new identifier | $KS_4$ |
| new global data available | $KS_3$ |
| new deals for state conditions | $KS_1$ |
| new industry conditions | $KS_6$ |

For example, using Table 1, if the risk related information is new economic data, then the risk analytics router 36 would poll domain knowledge source one. If the risk related information is new state conditions, then risk analytics router would poll domain knowledge source three. This invention is not limited to this control table and other tables are possible if desired.

Referring back to FIG. 3, after the risk analytics router 36 has determined which domain knowledge sources to poll, the applicable knowledge sources are polled at 44. The bids from the polled domain knowledge sources are received asynchronously by the risk analytics router at 46. After receiving the bids, the risk analytics router 36 creates a bid list at 48 and posts the list in the shared database 28 at 50. Next, the risk analytics router 36 sorts and prioritizes the bids at 52 in accordance with the risk related information that has been received at the input knowledge source 26. In particular, a priority table stored in the database 16 is accessed and used to determine the priority of the risk related information. An example of a priority table used to determine priority is set forth in Table 2.

TABLE 2

Priority Table

| result_status | priority |
|---|---|
| new econ data available | 2 |
| new state conditions | 2 |
| new deals for state conditions | 2 |
| new identifier | 2 |
| new exposure by SIC | 1 |
| new exposure by Client | 1 |
| new exposure by State | 1 |
| new ratings of deals | 1 |

For example, using Table 2, if the risk related information is new economic data, then the risk analytics router 36 would give this type of information less priority than information that pertains to new ratings of deals, new exposure by state, client, or SIC. Other risk related information that has the same priority as new economic data is new state conditions, new deals for state conditions, and new identifiers. This invention is not limited to this priority table and other priorities are possible if desired.

After the bids have been sorted and prioritized, then the risk analytics router 36 uses the scheduler 37 to set up a schedule indicating the tasks that have to be performed by the domain knowledge sources at 54. The scheduler tasks all of the undispatched bids and orders them from highest to lowest priority based on Table 2. Bids with the same priority are ordered from oldest to newest, such that older bids are dispatched first within the same priority level. The risk analytics router 36 then initiates the execution of the domain knowledge source from the top of the schedule at 56. The decision formulated from the domain knowledge source is received by the risk analytics router 36 and posted in the shared database 28 at 58. If it is determined at 60 that there are more tasks to be performed by other domain knowledge sources, then steps 56–58 are repeated until all of the tasks have been performed. Next, the risk analytics router 36 decides at 62 whether the risk related information requires that more information be obtained from other sources such as the large volumes of data in the database 20. If more risk related information is required, then the risk analytics router 36 repeats steps 44–60. After all of the processing has been performed by the domain knowledge sources 30, then the risk analytics router 36 routes all of the information in the shared database 28 to the output knowledge source 32 at step 64.

Figure 4:
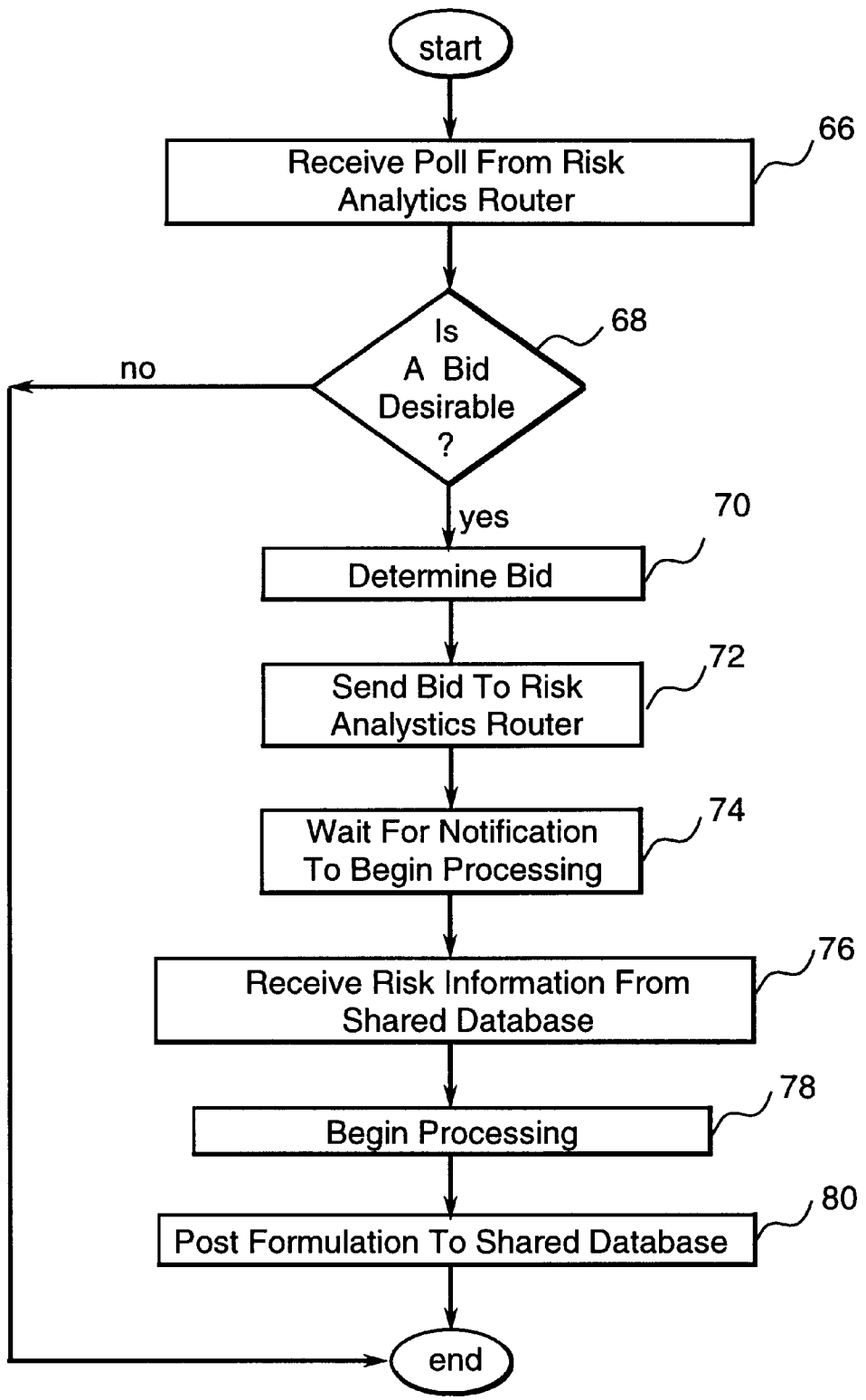
FIG. 4 is flow chart describing the operations performed by the domain knowledge sources upon being polled by the risk analytics router.

FIG. 4 is flow chart describing the operation of the domain knowledge sources 30 upon being polled by the risk analytics router 36. The operation begins by receiving a poll from the risk analytics router 36 at 66. The domain knowledge sources decide at 68 whether it is desirable to make a bid. In particular, when a domain knowledge source is polled, it executes a set of functions that look at predetermined objects on the shared database 28. The rules within these functions decide if the changes in these objects require that further actions (i.e., new calculations) be performed. If so, then the set of functions in the domain knowledge source determines a bid at 70 and sends the bid to the risk analytics router at 72. The domain knowledge source then waits at 74 for notification from the risk analytics router 36 to begin processing. Upon receiving notification, then the domain knowledge source receives the risk related information from the shared database at 76. In addition, the domain knowledge source receives any other information from the large volumes of data stored in the shared database that is necessary for it to formulate a decision. After receiving all of the necessary information, the domain knowledge source begins processing at 78 to formulate a decision on how the information affects a predetermined risk category. The domain knowledge source 30 then posts the decision on the shared database at 80 and waits to receive another poll from the risk analytics router 36.

Figure 5:
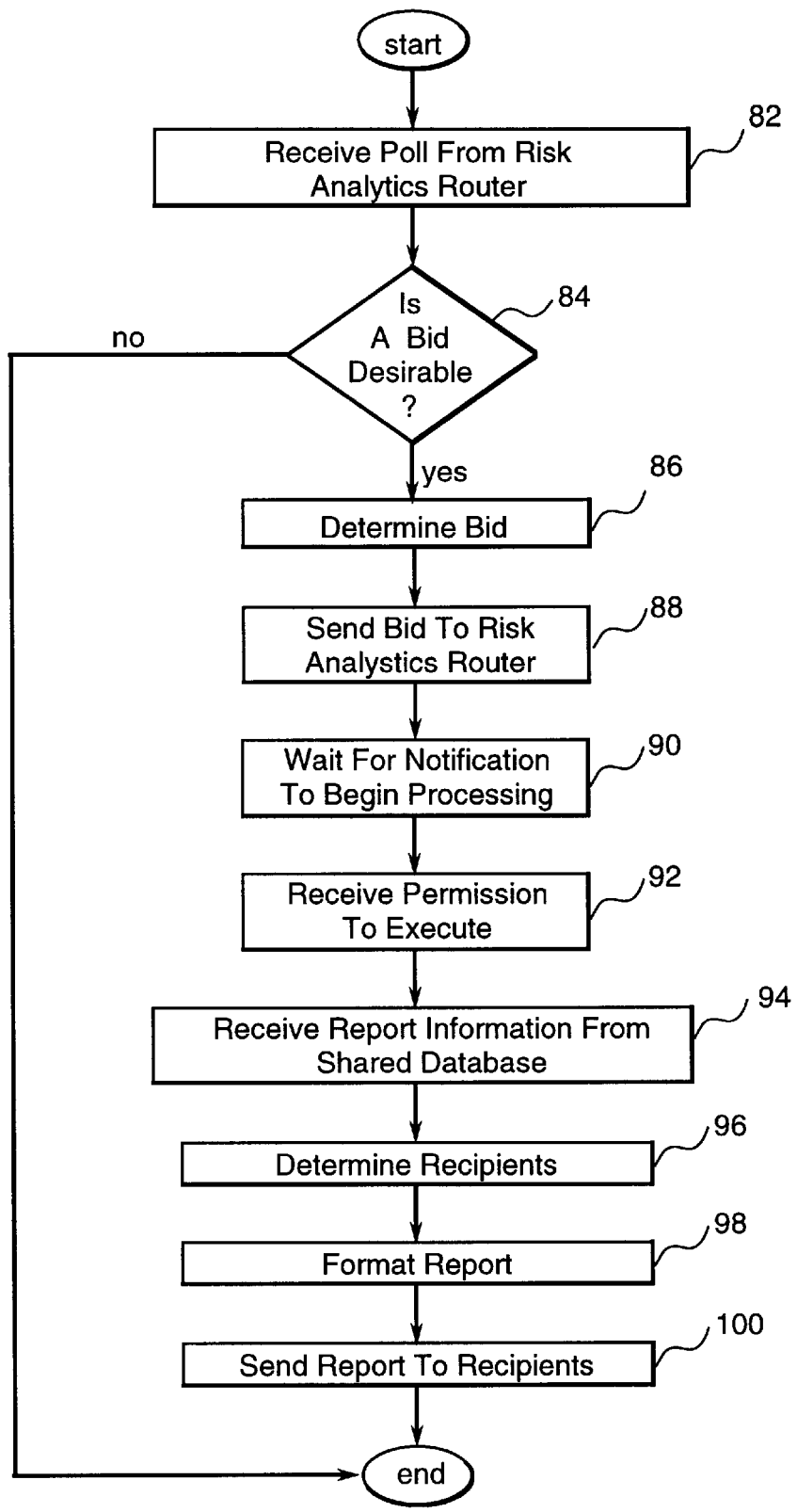
FIG. 5 is flow chart describing the operations performed by the output knowledge source upon being polled by the risk analytics router.

FIG. 5 is a flow chart describing the operations performed by the output knowledge source 26 upon being polled by the risk analytics router 36. The operation begins by receiving a poll message from the risk analytics router 36 at 82. The output knowledge source then decides at 84 whether it is desirable to make a bid. In particular, the output knowledge source 26 examines the shared database 28 and determines if there is enough of a change of information to warrant sending a risk report. If a bid is desirable, then the output knowledge source 26 determines a bid at 86 and sends the bid to the risk analytics router at 88. The output knowledge source 26 then waits for notification to begin processing at 90. Upon receiving permission to execute at 92, the output knowledge source then retrieves the latest risk ratings for the categories that it wants to report on from the shared database 28 at 94. The risk ratings are generated from the decisions formulated by the domain knowledge sources 30. Next, the output knowledge source 26 determines the recipients of the risk report at 96. The output knowledge source 26 then formats the risk report at 98 and sends it out to the recipients via electronic mail, voice mail, and/or facsimile at 100.

If the risk manager 24 was interested in monitoring the risk exposure of one of its clients, e.g., ABC Inc., the proactive risk monitoring system 10 would be used in the following manner. Once new risk related information was obtained it would be inputted to the proactive risk monitoring system 10 at the input knowledge source 26. For instance, any new balance sheet figures pertaining to the business of ABC are inputted to the system. The balance sheet figures for ABC are updated on the shared database 28. The risk analytics router 36 polls all of the domain knowledge sources 30 to see if any are interested in acting upon the updated information. Each domain knowledge source analyzes the information and proposes a bid if it desires. The bids are stored on a bid list on the shared database 28. The risk analytics router 36 builds a schedule according to the bids on the bid list. The new schedule is then updated on the shared database 28. The risk analytics router 36 using the dispatcher 39 pulls the first task from the top of the new schedule and sends it to the appropriate domain knowledge source. For instance, if the domain knowledge source that pertains to credit has the first task on the updated schedule, then this knowledge source executes on its bid. The decision formulated by the credit knowledge source is placed on the shared database 28. If there are any other tasks on the schedule for other domain knowledge sources to perform, then the tasks are executed and all decisions are placed on the shared database 28. Finally, the output knowledge source 32 takes all of the formulated decisions that have been posted on the shared database 28 and then generates a risk report 34 and sends it to the risk manager 24.

An example of the risk report 34 for ABC is shown in FIG. 6. This risk report provides the client's name and the description of their business. In this example, the risk manager is apprised that ABC's overall business rating has changed from strong to marginal because of a weak net cash flow which is set forth in the financial information provided in the report. The risk report also indicates that the business rating change is based on predetermined risk categories such as the enterprise that the client is in, the industry that the client's business is in, a business rating, a financial rating, and a collateral rating. In addition to the above information, the risk report provides a recommendation for the risk manager to follow. In this example, the risk manager is recommended to take actions aimed at reducing debt service and improving liquidity in the range of 20 to 30 million dollars. As mentioned above, the risk report may provide other types of risk related information in different forms if desired. For example, the report may indicate that there is an underexposure of risk for ABC or that the report may just provide status information.

In another scenario, the risk manager 24 may use the proactive risk monitoring system 10 to find out what the current economic conditions are and then determine which clients will be affected. In this example, the current economic conditions are loaded into the input knowledge source 26. The data contains information about the trend growth over a normalized rolling seven year period for each state and how each state did versus the expectation for the state. This information is based on employment figures gathered from the U.S. Department of Commerce and can be in table form. The tables are then updated on the shared database 28. The risk analytics router 36 polls all of the domain knowledge sources 30 to see if any are interested in acting upon the updated economic conditions. Each domain knowledge source analyzes the information and proposes a bid if it desires. The bids are stored on a bid list on the shared database 28. The risk analytics router 36 builds a schedule according to the bids on the bid list. The new schedule is then updated on the shared database 28. The risk analytics router 36 using the dispatcher 39 pulls the first task from the top of the new schedule and sends it to the appropriate domain knowledge source. In this example, the first task would be for the domain knowledge source that pertains to the geographic risk category, to generate a list of all of the states whose economic conditions are considered terrible. This list is then placed on the shared database 28. Another task that is performed by another domain knowledge source is to find all of the deals in a database of clients that do business in these states. After execution, the list of clients that do business in these states are posted on the shared database. After all of the tasks have been performed by the domain knowledge sources, then the output knowledge source 32 generates a risk report 34 and sends it to the risk manager 24.

It is therefore apparent that there has been provided in accordance with the present invention, a system and method for proactively monitoring risk exposure. The invention has been described with reference to several embodiments, however, it will be appreciated that variations and modifications can be effected by a person of ordinary skill in the art without departing from the scope of the invention.

We claim:

1. A system for monitoring risk exposure, comprising:
   an input knowledge source for receiving risk related information from a plurality of data sources;
   a shared database for storing the risk related information received at the input knowledge source;
   a plurality of domain knowledge sources for formulating a decision on how the risk related information in the shared database affects a predetermined risk category;
   an output knowledge source for generating a risk related report in response to the decisions formulated by each of the plurality of domain knowledge sources; and
   a risk analytics router for routing the risk related information in the input knowledge source to the shared database, routing the risk related information in the shared database to at least one of the plurality of domain knowledge sources, routing the decisions formulated from the domain knowledge sources to the shared database, and routing the decisions from the shared database to the output knowledge source, the risk analytics router comprising means for notifying the plurality of domain knowledge sources that risk related information is being stored in the shared database and means for polling the plurality of domain knowledge sources to act on the risk related information in the shared database.

2. The system according to claim 1, wherein the input knowledge source comprises means for notifying the risk analytics router that risk related information has been received and is being stored in the shared database.

3. The system according to claim 1, wherein the input knowledge source comprises means for translating the risk related information from the plurality of data sources into data objects.

4. The system according to claim 1, wherein each of the plurality of domain knowledge sources comprises means for generating a bid to act on the risk related information in response to the polling from the risk analytics router.

5. The system according to claim 4, wherein the shared database comprises a bid list for receiving bids generated from the plurality of domain knowledge sources.

6. The system according to claim 5, wherein the risk analytics router further comprises a scheduler for prioritizing the bids and assigning tasks to be performed by the plurality of domain knowledge sources.

7. The system according to claim 6, wherein the risk analytics router further comprises a dispatcher for dispatching the assigned tasks to the plurality of domain knowledge sources.

8. The system according to claim 7, wherein each of the plurality of domain knowledge sources comprises means for updating the risk related information in the shared database according to the formulated decisions.

9. The system according to claim 1, wherein the output knowledge source comprises means for sending the risk related report to a risk manager for proactively monitoring the risk exposure of a portfolio of clients.

10. A method for monitoring risk exposure, comprising the steps of:

receiving risk related information from a plurality of data sources with an input knowledge source;

storing the risk related information received at the input knowledge source with a shared database;

notifying a risk analytics router that risk related information has been received and is being stored in the shared database;

notifying the plurality of domain knowledge sources with the risk analytics router that risk related information is being stored in the shared database;

polling the plurality of domain knowledge sources with the risk analytics router to act on the risk related information;

routing the risk related information in the shared database to at least one of a plurality of the polled domain knowledge sources with the risk analytics router;

formulating a decision on how the risk related information in the shared database affects a predetermined risk category with at least one of the plurality of domain knowledge sources;

routing the decisions formulated from the domain knowledge sources to the shared database with the risk analytics router;

routing the decisions from the shared database to an output knowledge source with the risk analytics router; and generating a risk related report from the decisions with an output knowledge source.

11. The method according to claim 10, further comprising translating the risk related information received at the input knowledge source into data objects.

12. The method according to claim 10, further comprising generating a bid from the plurality of domain knowledge sources to act on the risk related information in response to the polling from the risk analytics router.

13. The method according to claim 12, further comprising generating a bid list for receiving bids generated from the plurality of domain knowledge sources.

14. The method according to claim 13, further comprising prioritizing the bids and assigning tasks to be performed by the plurality of domain knowledge sources with a scheduler.

15. The method according to claim 14, further comprising dispatching the assigned tasks to the plurality of domain knowledge sources with a dispatcher.

16. The method according to claim 15, further comprising updating the risk related information in the shared database according to the formulated decisions.

17. The method according to claim 10, further comprising sending the risk related report to a risk manager for proactively monitoring the risk exposure of a portfolio of clients.

* * * * *